June 2, 1959 G. M. HIPPLE 2,888,943
CONTROL VALVE HAVING CONSTANT VOLUME OUTPUT FEATURES
Filed Sept. 25, 1957 2 Sheets-Sheet 1

INVENTOR.
GEORGE M. HIPPLE
BY
Donald J. Detrich,
AGENT.

United States Patent Office 2,888,943
Patented June 2, 1959

2,888,943

CONTROL VALVE HAVING CONSTANT VOLUME OUTPUT FEATURES

George M. Hipple, Columbus, Ohio, assignor to American Brake Shoe Company, New York, N.Y., a corporation of Delaware Application September 25, 1957, Serial No. 686,168

8 Claims. (Cl. 137—106)

My invention relates generally to fluid control valves and more particularly to fluid control valves that may be adjusted through an infinite range from zero volume to the full volumetric capacity of the valve and the output volume of which will remain constant for any volumetric adjustment of the valve.

One object of the invention is to provide improved structure in a valve of the type set forth.

Another object of the invention is to provide improved structure in a valve of the type set forth whereby the valve is manually adjustable to provide different output volumes and is also automatically adjustable within itself to maintain the output volume for which the valve has been manually adjusted substantially constant regardless of fluctuations in fluid pressure at its input port or that port thereof which is acting as its working or output port.

In carrying out the foregoing object, it is another object of the invention to provide a control valve including a manually adjustable main control element preferably, but not necessarily, in the form of a spool in which there is a piston which operates a bleed-off valve associated with the inlet pressure port of the device, the piston being operated by a spring and a differential in pressures at opposite sides of a control orifice the open area of which is adjusted by the manually adjustable volume control element, said bleed-off valve functioning to maintain said differential in pressures substantially constant.

Another and more specific object of the invention is to provide improved construction in a four-way valve whereby the foregoing objects are attained regardless of which of two ports thereof is functioning as its working or outlet port.

Further objects and advantages of the present invention will be apparent from the following description, reference being had to the accompanying drawings wherein a preferred form of embodiment of the invention is clearly shown.

In the accompanying drawings:

Fig. 4 is a fragmentary view on a larger scale, the view showing the central portion of the body of the four-way control valve in section and the central portion of the manually operated spool thereof in elevation.

Figure 1:
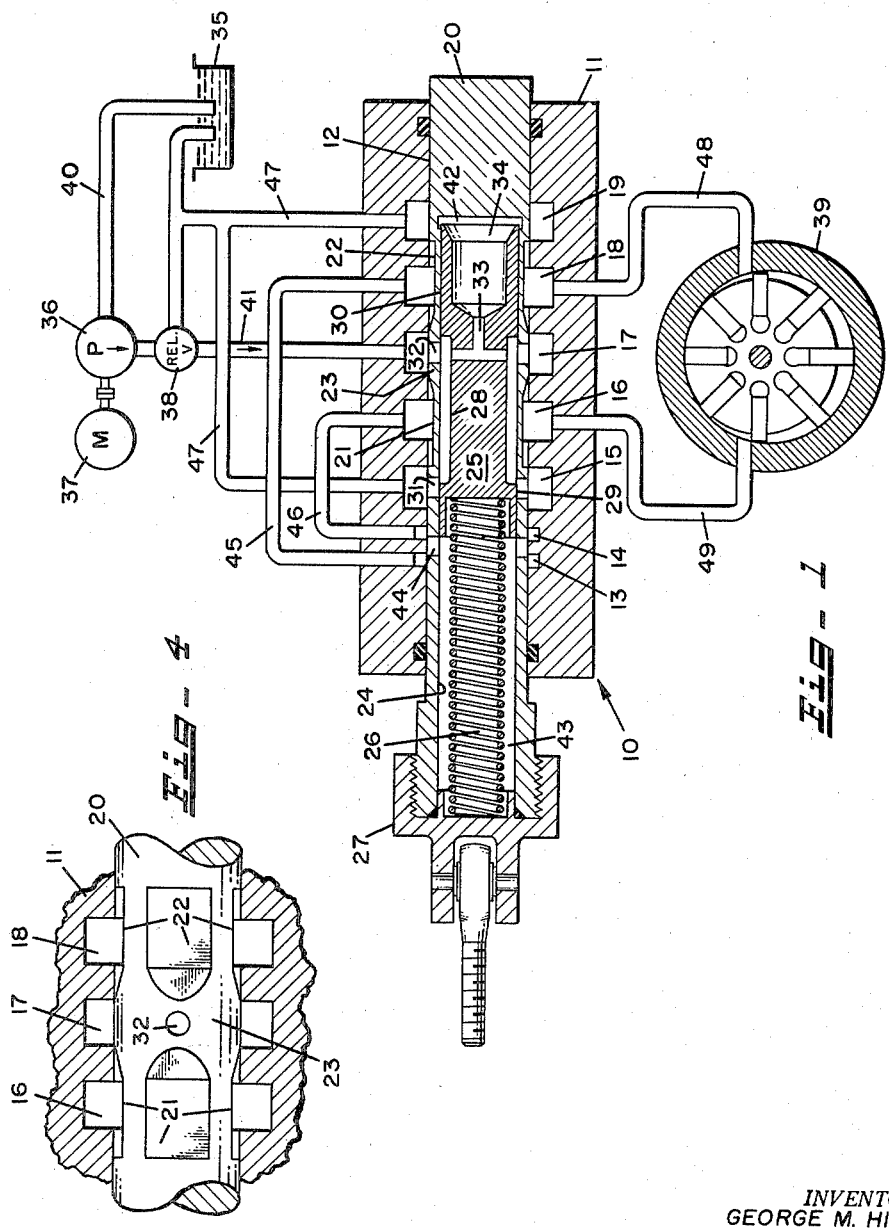
Fig. 1 is a diagrammatic view of a hydraulic system including a four-way valve which incorporates the features of the invention, the manually operated control spool of the valve being shown in its central, neutral or off position and the shuttle piston being shown in that position wherein it by-passes the entire output volume of the pump to the tank.

Fig. 1 of the drawings illustrates diagrammatically a hydraulic circuit or system including a control valve 10 which embodies the features of the invention. The valve illustrated is a four-way control valve which is manually adjustable to provide different output volumes and is also automatically adjustable within itself to maintain the output volume to which the valve has been manually adjusted substantially constant regardless of fluctuations in fluid pressure at its input port or at that port thereof which is acting as its working or output port.

Referring now to the valve 10 and its construction, this valve includes a body, casing or housing 11 having a central bore 12 extending therethrough which is surrounded by a plurality of spaced annular ports or grooves 13 through 19 formed in the body and each of which is connected to the exterior of the body 11 by passage means formed in the body. The central bore 12 slidingly receives a manually shiftable cylindrical core or spool element 20 which has four sets of notches 21 and 22 ground therein and each set of which is separated by a land 23. These notches 21 and 22 will hereinafter be referred to as grooves 21 and 22 and from the following description it will be seen that the grooves 21 and 22 could be formed, for example, by grinding circumferential grooves in the core element 20.

The core element 20 is bored axially through one of its ends to provide it with a cylindrical bore 24 in which a generally cylindrical shuttle piston element 25 reciprocates. The shuttle element 25 is urged toward the closed end of the cylinder bore 24 by a spring 26 which is seated in a socket formed in one end of the shuttle and which abuts a cap 27 that is threadedly attached and sealed to the bored end of the core element 20.

The shuttle element 25 is provided with a single circumferential groove 28 and two lands 29 and 30, one at each end of the groove 28. These end lands 29 and 30 cooperate with ports 31 and 32, respectively, in the core 20 to form valves. The ports 31 and 32 are formed through the lands 29 and 23, respectively, and they are always in communication with the annular ports or grooves 15 and 17, respectively, in the body 11. The shuttle piston element 25 is also provided with intersecting bores or passages 33 which connect its annular groove 28 with one of its ends 34.

The operation of the valve 10 is easily understood from the following description of the illustrated hydraulic circuit or system of which the valve 10 forms a part. The hydraulic circuit or system includes a tank or reservoir 35 for hydraulic fluid, a hydraulic pump 36 driven by a motor 37, a relief valve 38, the valve 10 which includes the features of the invention, and a reversible vane type rotary hydraulic motor 39. The pump 36 receives hydraulic fluid from the tank 35 through a suction conduit 40 and discharges hydraulic fluid under pressure into a pressure conduit 41 in which the relief valve 38 is located.

The pressure conduit 41 is connected to the annular pressure port or groove 17 of valve 10 and when the manually operated control core element 20 of the valve is in its central or neutral position as shown in Fig. 1 of the drawings fluid flows from the port 17 through the port 32 in the core element 20 to the circumferential groove 28 in the shuttle piston element 25. Fluid flows from the groove 28 through the bores or passages 33 in the shuttle 25 and into a high pressure chamber 42 formed by the bore 24 and the end 34 of the shuttle piston 25. The pressure of this fluid in high pressure chamber 42 will, of course, cause the shuttle piston 25 to move against the force of the spring 26 and open the valve formed by the port 31 and land 29. As the shuttle piston 25 moves to compress the spring 26, fluid will be displaced from the low pressure chamber 43 through a port 44 in the core element 20 which is in communication with the ports 13 and 14. Ports 13 and 14 are connected respectively by conduits 45 and 46 with ports 18 and 16, both of which are in communication with the tank 35 when the core 20 is in its neutral position. As the valve 31, 29 opens, fluid will be bled from the groove or port 17 by flowing through the port 32 and groove 28 and drain conduit 47 to tank 35.

It will be seen that when the core element is in the position shown in Fig. 1 of the drawings and described above that all of the volumetric output of the pump 36 will be by-passed to tank 35 and that the pressure in the pressure conduit 41, the annular groove or port 17 and groove or passage 28 will be equal to the force exerted by the spring 26 on the shuttle piston 25 divided by the area of one end of the shuttle 25. For the purposes of this description, the spring 26 will be assumed to exert a force of fifty pounds upon the shuttle and the area of each of the ends of the shuttle will be assumed to be one square inch. Under these conditions, the pressure in conduit 41, port 17 and groove 28 will be fifty pounds per square inch.

Figure 2:
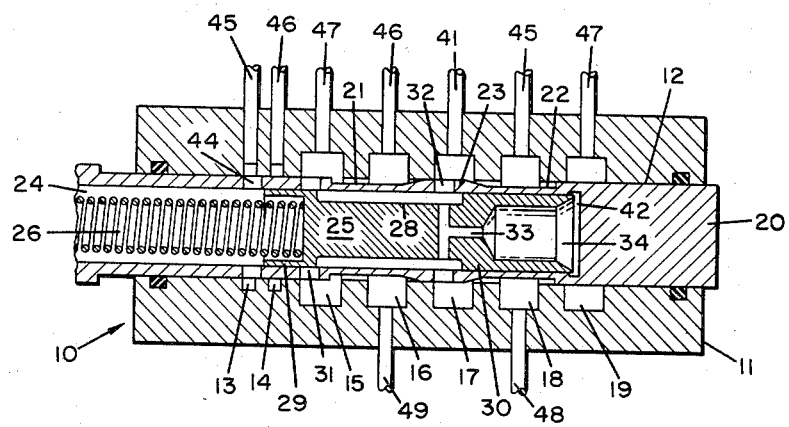
Fig. 2 is a view of a part of the valve seen in Fig. 1, and in which the manually operated control spool has been shifted to the left of the position seen in Fig. 1.

When it is desired to cause the hydraulic motor 39 to rotate in a clockwise direction, the manually operated core 20 is shifted to the left toward or to the position illustrated in Fig. 2 of the drawings to open a valve formed by the annular groove 17 and the land 23 which admits fluid under pressure to the grooves 22 in the core 20. From these grooves 22, the fluid will flow by way of the annular groove 18 and a conduit 48 to one side of the motor 39 to drive the latter. Exhaust fluid from the motor 39 will flow through a conduit 49 to annular groove or port 16, along grooves 21 to annular groove 15 and through drain conduit 47 to tank 35.

As clearly shown in Fig. 4 of the drawings, the ends of the notches which form the grooves 21 and 22 in the core 20 adjacent the land 23 are tapered, that is, they slope gradually from the bottoms of the grooves or notches 21 and 22 to the ends of the land 23 and this is for the purpose of permitting the valves formed by the land 23 and the annular groove or port 17 to operate as orifices the open area of which may be adjusted gradually by shifting the control core 20 through a relatively great distance in the bore 12. Explained in a different manner, the gradual slopes or tapers on the control core 20 between the bottoms of the grooves or notches 21 and 22 and the land 23 permit of a relatively long stroke of the control core or spool 20 between those positions in which the valves are fully closed and fully open and this permits of relatively gradual, and fine or accurate adjustment of the orifices formed by the land 23 and the grooves or notches 17 and 18.

From the description of the valve 10 thus far given, it will be seen that when the core 20 is shifted to the left toward the position shown in Fig. 2 that the valve 17, 23 will be opened to permit fluid to flow from annular groove 17 through the orifices 17, 23 to the annular groove 18 and from this latter groove through conduit 48 to motor 39 and that the work load upon the motor 39 will be reflected to groove or port 18 causing an increase in fluid pressure in the latter. Since groove 18 is connected through conduit 45, groove 13 and port 44 with chamber 43 this pressure, which will be equal to the pressure at the low pressure side of the orifices 17, 23, will also be applied to the end of the shuttle element 25 in the chamber 43. It will thus be seen that the fluid pressure in the groove 17 which is at the high pressure side of the orifices 17, 23 will be applied at all times to the chamber 42 and the end 34 of the shuttle 25 and that this pressure will act to urge the shuttle 25 to the left to compress spring 26 but that since the pressure at the low pressure side of the orifices 17, 23 taken from groove 18 is applied to the chamber 43 and the opposite end of the shuttle 25 that this latter pressure opposes the pressure in chamber 42 and since the opposite ends of the shuttle 25 are of equal area the shuttle 25 will be urged to the right at all times only by the force of the spring 26. Thus, in the example given, there will always be a pressure differential between the grooves 17 and 18 of 50 p.s.i. regardless of the pressure in groove 18 until the latter pressure increases to 50 p.s.i. lower than that pressure at which the relief valve 38 opens. As the pressure in groove 18 increases beyond a pressure of 50 p.s.i. lower than that pressure at which the relief valve 38 opens there may be a gradual equalization in pressures between the grooves 17 and 18 until the relief valve 38 opens.

Figure 3:
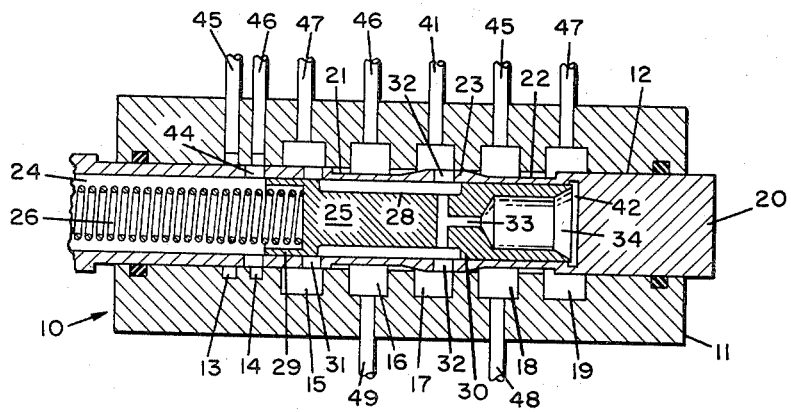
Fig. 3 is a view similar to Fig. 2, but showing the manually operated control spool shifted to the right of the position seen in Fig. 1.

When the core 20 is shifted from the position seen in Fig. 1 toward or to the position shown in Fig. 3, the valve 17, 23 will be opened to permit fluid to flow from the groove 17 to the groove 16 and from this latter groove through conduit 49 to motor 39 to cause the latter to rotate in a counterclockwise direction. Exhaust fluid from the motor will flow through conduit 48, grooves 18, 22 and 19 and conduit 47 to tank 35. When the core 20 is shifted to the right, the port 13 is closed and port 14 is opened to permit the pressure in the groove 16, which is now at the low pressure side of the orifice valve 17, 23 to be conducted through conduit 46 to the chamber 43 and the operation of the valve is otherwise as previously described.

While the form of embodiment of the present invention as herein disclosed constitutes a preferred form, it is to be understood that other forms might be adopted, all coming within the scope of the claims which follow:

I claim:

1. An adjustable constant volume control valve including a body having a bore; a plurality of spaced ports in said bore, one of said ports being a pressure port adapted to receive fluid under pressure from an outside source and another of said ports being an exhaust port through which fluid may be delivered from said valve; a manually movable spool in said bore, said spool having an axial bore and means cooperating with one of said ports to form a valve between the ports; a shuttle piston in said spool bore; means forming a high pressure chamber at one end of said shuttle piston and a low pressure chamber at the opposite end of said shuttle piston; spring means urging said shuttle piston into said high pressure chamber; passage forming means connecting said pressure port and said high pressure chamber; passage forming means connecting said exhaust port and said low pressure chamber; valve means opened by said shuttle piston when the latter is moved by pressure in said high pressure chamber toward the low pressure chamber, and passage means connecting said last-mentioned valve means with said pressure port whereby fluid will be bled from the pressure port to maintain a substantially constant pressure differential between said pressure and exhaust ports.

2. An adjustable constant volume control valve including a body having a bore; a plurality of spaced ports in said bore, one of said ports being a pressure port adapted to receive fluid under pressure from an outside source and another of said ports being an exhaust port through which fluid may be delivered from said valve; a manually movable spool in said bore, said spool having an axial bore and means cooperating with one of said ports to form a valve between the ports; a port in said spool establishing constant communication between said pressure port and the spool bore; a shuttle piston in said spool bore, said shuttle piston including passage forming means in constant communication with said port in the spool; means forming a high pressure chamber at one end of said shuttle piston and a low pressure chamber at the opposite end of said shuttle piston; spring means urging said shuttle piston into said high pressure chamber, said passage forming means in said shuttle piston connecting said high pressure chamber and said port in said spool at all times; passage forming means connecting said exhaust port and said low pressure chamber; valve means opened by said shuttle piston when the latter is moved by pressure in said high chamber toward said low pressure chamber, said last-mentioned valve means functioning to bleed fluid from the passage forming means in said shuttle piston thereby to maintain a substantially constant pressure differential between said pressure and exhaust ports.

3. An adjustable constant volume control valve including a body having a bore; a plurality of spaced ports in said bore, one of said ports being a pressure port adapted to receive fluid under pressure from an outside source and another of said ports being an exhaust port through which fluid may be delivered from said valve; a manually movable spool in said bore, said spool having an axial bore and means cooperating with one of said ports to form a valve between the ports; a port in said spool establishing constant communication between said pressure port and the spool bore; a shuttle piston in said spool bore, said shuttle piston having a peripheral groove between two lands in constant communication with said port in the spool; means forming a high pressure chamber at one end of said shuttle piston and a low pressure chamber at the opposite end of said shuttle piston; spring means urging said shuttle piston into said high pressure chamber, passage forming means in said shuttle piston connecting said high pressure chamber and said groove at all times; passage forming means connecting said exhaust port and said low pressure chamber; valve means opened by said shuttle piston when the latter is moved by pressure in said high chamber toward said low pressure chamber, said last mentioned valve means functioning to bleed fluid from the pressure port through said groove in said shuttle piston thereby to maintain a substantially constant pressure differential between said pressure and exhaust ports.

4. An adjustable constant volume control valve including a body having a bore; a plurality of spaced ports in said bore, one of said ports being a pressure port adapted to receive fluid under pressure from an outside source and another of said ports being an exhaust port through which fluid may be delivered from said valve; a manually movable spool in said bore, said spool having an axial bore and means cooperating with one of said ports to form a valve between the ports; a port in said spool establishing constant communication between said pressure port and the spool bore; a shuttle piston in said spool bore, said shuttle piston having a peripheral groove between two lands in constant communication with said port in the spool; means forming a high pressure chamber at one end of said shuttle piston and a low pressure chamber at the opposite end of said shuttle piston; spring means urging said shuttle piston into said high pressure chamber, passage forming means in said shuttle piston connecting said high pressure chamber and said groove at all times; passage forming means connecting said exhaust port and said low pressure chamber; valve means opened by said shuttle piston when the latter is moved by pressure in said high chamber toward said low pressure chamber, said last-mentioned valve means including a second port in said spool and one of said lands on said shuttle piston and functioning to bleed fluid from the pressure port through said groove in said shuttle piston thereby to maintain a substantially constant pressure differential between said pressure and exhaust ports.

5. An adjustable four-way constant volume output control valve including a body having a bore; a plurality of spaced ports in said bore, one of said ports being a pressure port adapted to receive fluid under pressure from an outside source, a pair of ports adapted to function selectively alternately one as a supply port through which fluid may be delivered from said valve and the other as a return port through which fluid may be returned through said valve; a manually movable spool in said bore, said spool having an axial bore; means on said spool cooperating with said ports to form a valve between said pressure port and each port of said pair of ports; a shuttle piston in said spool bore; means forming a high pressure chamber at one end of said shuttle piston and a low pressure chamber at the opposite end of said shuttle piston; spring means urging said shuttle piston into said high pressure chamber; passage forming means connecting said pressure port and said high pressure chamber; passage forming means for connecting said pair of ports and said low pressure chamber; valve means operated by said spool to connect said last-named passage means selectively with said low pressure chamber; valve means opened by said shuttle piston when the latter is moved by pressure in said high pressure chamber toward the low pressure chamber, and passage means connecting said last-mentioned valve means with said pressure port whereby fluid will be bled from the pressure port to maintain a substantially constant pressure differential between said pressure port and that port which is acting as the supply port.

6. An adjustable four-way constant volume output control valve including a body having a bore; a plurality of spaced ports in said bore, one of said ports being a pressure port adapted to receive fluid under pressure from an outside source, a pair of ports adapted to function selectively alternately one as a supply port through which fluid may be delivered from said valve and the other as a return port through which fluid may be returned through said valve; a manually movable spool in said bore, said spool having an axial bore; means on said spool cooperating with said ports to form a valve between said pressure port and each port of said pair of ports; a port in said spool establishing constant communication between said pressure port and the spool bore; a shuttle piston in said spool bore, said shuttle piston including passage forming means in constant communication with said port in the spool; means forming a high pressure chamber at one end of said shuttle piston and a low pressure chamber at the opposite end of said shuttle piston; spring means urging said shuttle piston into said high pressure chamber, said passage forming means in said shuttle piston connecting said high pressure chamber and said port in said spool at all times; passage forming means for connecting said pair of ports and said low pressure chamber; valve means operated by said spool to connect said last-named passage means selectively with said low pressure chamber; valve means opened by said shuttle piston when the latter is moved by pressure in said high pressure chamber, toward said low pressure chamber, said last-mentioned valve means functioning to bleed fluid from the passage forming means in said shuttle piston thereby to maintain a substantially constant pressure differential between said pressure port and port which is acting as the supply port.

7. An adjustable four-way constant volume output control valve including a body having a bore; a plurality of spaced ports in said bore, one of said ports being a pressure port adapted to receive fluid under pressure from an outside source, a pair of ports adapted to function selectively alternately one as a supply port through which fluid may be delivered from said valve and the other as a return port through which fluid may be returned through said valve; a manually movable spool in said bore, said spool having an axial bore; means on said spool cooperating with said ports to form a valve between said pressure port and each port of said pair of ports; a port in said spool establishing constant communication between said pressure port and the spool bore; a shuttle piston in said spool bore, said shuttle piston having a peripheral groove between two lands in constant communication with said port in the spool; means forming a high pressure chamber at one end of said shuttle piston and a low pressure chamber at the opposite end of said shuttle piston; spring means urging said shuttle piston into said high pressure chamber, passage forming means in said shuttle piston connecting said high pressure chamber and said groove at all times; passage forming means for connecting said pair of ports and said low pressure chamber; valve means operated by said spool to connect said last-named passage means selectively with said low pressure chamber; valve means opened by said shuttle piston when the latter is moved by pressure in said high pressure chamber, toward said low pressure chamber, said last-mentioned valve means functioning to bleed fluid from the pressure port through said groove in said shuttle piston thereby to maintain a substantially constant pressure differential between said pressure port and port which is acting as the supply port.

8. An adjustable four-way constant volume output control valve including a body having a bore; a plurality of spaced ports in said bore, one of said ports being a pressure port adapted to receive fluid under pressure from an outside source, a pair of ports adapted to function selectively alternately one as a supply port through which fluid may be delivered from said valve and the other as a return port through which fluid may be returned through said valve; a manually movable spool in said bore, said spool having an axial bore; means on said spool cooperating with said ports to form a valve between said pressure port and each port of said pair of ports; a port in said spool establishing constant communication between said pressure port and the spool bore; a shuttle piston in said spool bore, said shuttle piston having a peripheral groove between two lands in constant communication with said port in the spool; means forming a high pressure chamber at one end of said shuttle piston and a low pressure chamber at the opposite end of said shuttle piston; spring means urging said shuttle piston into said high pressure chamber, passage forming means in said shuttle piston connecting said high pressure chamber and said groove at all times; passage forming means for connecting said pair of ports and said low pressure chamber; valve means operated by said spool to connect said last-named passage means selectively with said low pressure chamber; valve means opened by said shuttle piston when the latter is moved by pressure in said high pressure chamber, toward said low pressure chamber, said last-mentioned valve means including a second port in said spool and one of said lands on said shuttle piston and functioning to bleed fluid from the pressure port through said groove in said shuttle piston thereby to maintain a substantially constant pressure differential between said pressure port and port which is acting as the supply port.

References Cited in the file of this patent
UNITED STATES PATENTS

| | | |
|---|---|---|
| 2,649,107 | Avery | Aug. 18, 1953 |
| 2,757,641 | Meddock | Aug. 7, 1956 |